United States Patent [19]
Ebihara et al.

[11] Patent Number: 4,918,988
[45] Date of Patent: Apr. 24, 1990

[54] METHOD OF DETECTING A DEFECTIVE POSITION IN A CEMENT INTIMATE MIXTURE FILLED PORTION IN A BUILDING

[75] Inventors: Masaaki Ebihara, Kasukabe; Kyosuke Nomura, Musashino, both of Japan

[73] Assignee: Taisei Corporation, Tokyo, Japan

[21] Appl. No.: 316,608

[22] Filed: Feb. 24, 1989

Related U.S. Application Data

[63] Continuation of Ser. No. 137,508, Dec. 23, 1987, abandoned.

[51] Int. Cl.$^5$ .............................................. G01M 7/00
[52] U.S. Cl. ........................................ 73/594; 73/12
[58] Field of Search ..................... 73/11, 12, 582, 584, 73/586, 588, 594, 614

[56] References Cited

U.S. PATENT DOCUMENTS

| 2,635,746 | 4/1953 | Gordon | 73/579 |
| 3,623,358 | 11/1971 | Sugimoto | 73/579 |
| 4,163,393 | 8/1979 | Gutierrez et al. | 73/12 |
| 4,402,210 | 9/1983 | Vendeberg | 73/12 |
| 4,534,206 | 8/1985 | Kiso et al. | 73/12 |

FOREIGN PATENT DOCUMENTS 0153247 9/1982 Japan ........................................ 73/11

Primary Examiner—Hezron E. Williams
Assistant Examiner—Mark A. Spector
Attorney, Agent, or Firm—William D. Blackman; Arnold S. Weintraub

[57] ABSTRACT

The surface of a cement intimate mixture filled portion in a building is tapped by a hammer, and a tapping sound thus generated is received by a micropone and converted to an electrical signal. The electrical signal representing the attenuation characteristic, which is different depending on the presence or absence of a defective unfilled portion in the cement filled portion, is sampled to obtain a maximum peak value and/or an integrated value. The maximum peak value and/or the integrated value is compared with a reference value to decide the presence or absence of a defect in the cement filled portion.

14 Claims, 9 Drawing Sheets

HERE, MAXIMUM VALUE OF THE AMPLITUDE IS 100%.

METHOD OF DETECTING A DEFECTIVE POSITION IN A CEMENT INTIMATE MIXTURE FILLED PORTION IN A BUILDING

BACKGROUND OF THE INVENTION

1. Field of the Invention:

The present invention relates to a method of detecting a defective portion, such as a portion unfilled with a cement intimate mixture in a region filled with the cement intimate mixture such as cement or mortar, or a peeled and separate portion of the cement intimate mixture in a building or structure. More particularly, the present invention relates to a method of detecting a defective portion easily, rapidly and without fail by utilizing a phenomenon in which the attenuation characteristic of a tapping sound generated by tapping the cement intimate mixture portion of the building from the outside differs depending on the presence or absence of the defects.

2. Prior Art:

The present invention is applicable, in a building having a tile on the structural surface of the building interposing a mortar filled portion therebetween, to detect a peeled position between the mortar portion and the structural surface, or between the mortar portion and the tile.

The present invention is, also, applicable in a building having a mortar coated on the structural surface of the building, to detect a peeled position between the inner surface of the mortar and the structural surface of the building.

Furthermore, the present invention is applicable in a concrete building to detect an unfilled position in a concrete filled portion inside of the structure of the building.

The following methods are known in the art as methods for detecting a defective position in a cement intimate mixture in a building or structure.

1. A method of detection based on the magnitude of an echo generated by tapping or striking a finished surface, disclosed in Japanese Patent Laid-Open Publication No. 60-211360 (1985).

2. A method of detection based on the characteristic of a waveform of an echo generated by tapping or striking a finished surface, disclosed in Japanese Patent Laid-Open Publication No. 61-161449 (1986)

3. A method of detection based on the repulsion acceleration generated in a tapping tool by tapping a finished surface, disclosed in Japanese Patent Laid-Open Publication No. 61-292554 (1986).

4. A method of detection utilizing an infrared ray.

5. A method of detection utilizing a ultrasonic wave, disclosed in Japanese Patent Laid-Open Publication No. 57-136160 (1982).

However, these prior art methods are not problem free. Specifically, in each method of references 1, 3 and 5 (above), the depth of a defective position from the surface of the building is limited to about 20 mm, and the detection accuracy is degraded when the depth increases more than that. In the prior art methods of references 1, 2 and 3, when a defect of peeling of mortar or the like is present in a deep portion it is difficult to be detected satisfactorily, for example, where in the case of n outer wall of a building, substrate mortar has been ₂led off the structural surface of the building, or the mortar has not been filled from the first. As a result, if this condition is left as it is, the peeling of the mortar will be increased, and there is the danger that a large area of mortar filled portion will fall on the ground.

Furthermore, in the prior art method of reference 5, in order to detect an unfilled or peeled position in a deep portion, the building body must be sandwiched with a receiver and a transmitter, respectively, at the front and rear sides thereof. Thus, the positioning of the receiver and transmitter is difficult, and it is impossible to operate for detection by a single operator.

On the other hand, in the prior art method of reference 2, in order to process and analyze the tapping sounds, it takes 500 ms for each sound signal. In the prior art methods of references 4 and 5, the apparatus is complicated and the manipulation thereof is difficult, and it requires technical knowledge and experience.

SUMMARY OF THE INVENTION

The present invention was made in view of the aforementioned problems in the prior art. It is, therefore, an object of the invention to provide a method of detecting a defective position in a cement intimate mixture filled portion, which method can be implemented easily without requiring particular technical knowledge and experience, and is adapted for real time processing, and is accurate in detection and diagnosis of a deep portion of a depth of 20 mm or more.

In order to achieve the above object, in the present invention, a defective position in a cement intimate mixture filled portion in a building is detected by tapping a surface of the cement intimate mixture filled portion from the outside thereof, converting a tapping sound to a tapping sound signal, obtaining an attenuation characteristic of the tapping sound in the tapping sound signal with respect to lapse of time from the tapping, and comparing the attenuation characteristic with a reference value.

Where the depth of a defect is shallow and less than 20 mm, a maximum amplitude value of a waveform of a tapping sound is more than two times as great as the value in which no defect is present. As a result, the presence or absence of the defect can be determined by the maximum amplitude value alone. However, where the depth of a defective position from the finished surface exceeds 20 mm, the maximum amplitude value is not changed depending on the presence or absence of the defect. Accordingly, it is difficult to determine only by the maximum amplitude value of the waveform of the tapping sound.

On the other hand, the attenuation characteristic of the waveform of the tapping sound changes distinctly even when the defect is present in a deep portion having a depth of 40 mm or more.

Accordingly, in the present invention, a tapping sound signal at the instant of tapping is removed since it is not changed distinctly depending on the presence or absence of the defect. Thus, a portion of the tapping sound waveform which changes distinctly depending on the presence or absence of the defect is extracted, and a maximum signal level value of the extracted portion, or an integrated value of time series signals is used. In this manner, the measurement of the presence or absence of a defect can be achieved with high accuracy even when the defect is present in a deep portion. In addition, there is no need of performing particular waveform analysis, and the real-time processing is made possible with a simple circuit.

DESCRIPTION OF THE PREFERRED EMBODIMENTS

Figure 1:
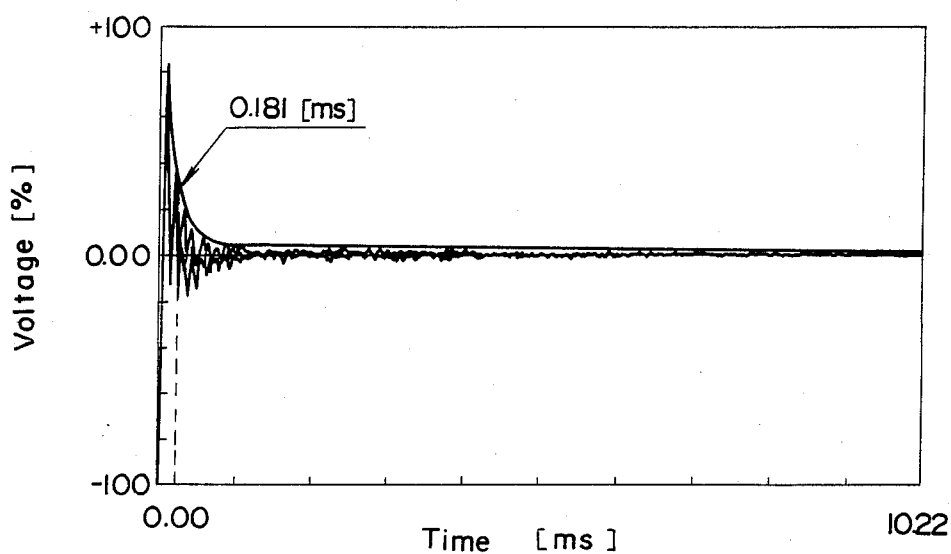
FIG. 1 is a graph showing the attenuation characteristic of a tapping sound waveform generated when there is no defect.
Figure 2:
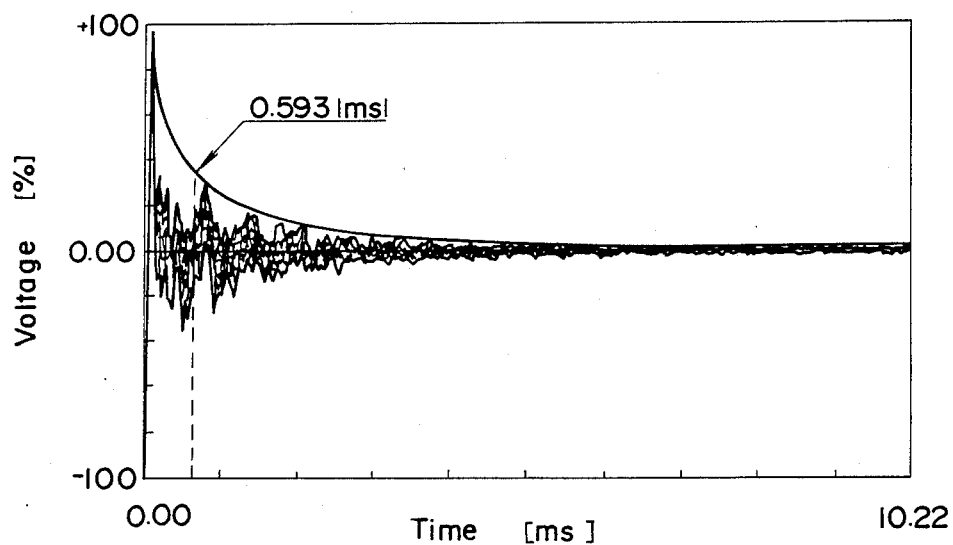
FIG. 2 is a graph showing the attenuation characteristic of a tapping sound waveform generated when there is a defect.

By way of reference, FIG. 1 shows a waveform of a tapping sound generated in a perfect tile in which no unfilled portion of mortar exists, and no peeled portion exists. FIG. 2 shows a waveform of a tapping sound generated in a tile portion in which a defect of peeling of mortar exists in a deep portion, and the ordinate represents a sound pressure level (amplitude) of the tapping sound, and the abscissa represents a time axis having a zero time corresponding to the instant of tapping. As will be seen from FIG. 2, the magnitude (amplitude) of the tapping sound signal attenuates with time exponentially having a maximum value at the instant of tapping, and the time constant thereof is 0.181 ms in the case of a perfect tile whereas 0.593 ms in the case of defective tile indicating a large difference therebetween.

Referring, again, to the drawing, and in particular, to FIGS. 12, 13, 14, 15 and 19 there is shown a tapping section, including a hammer 4 for striking or tapping a cement intimate mixture filled portion in a building or structure, a driving device, and a microphone 7 accommodated in a case 104. The case 104 includes a bottom plate 101 having a tapping aperture 101a, side plates 102a and 102b, and an upper cover 103. A partition 105 divides the inside of the case 104 into a sound receiving section including the microphone 7 and a tapping section including the hammer 4. A rotary solenoid 106 is mounted on the partition 105. A balancer 107 is secured to a rotary shaft 106a of the rotary solenoid 106. The hammer 4 is coupled to the balancer 107 through a coil spring 109 to constitute the tapping section. The balancer 107 and the coil spring 109 are coupled to the rotary shaft 106a so that the turning moments of the balancer 107 and the coil spring 109 are equal to each other, and the balancer 107 and the coil spring 109 are positioned symmetrically.

A stopper 110 is provided on the partition 105, and it restricts a rotation angle of the balancer 107 when the balancer 107 rotates forwardly or backwardly when driven by the rotary solenoid 106 thereby making a swing angle of the hammer 4 constant. As a result, the force of the hammer 4 which strikes or taps through the tapping aperture 101a on a cement intimate mixture filled portion, such as a tile 2, of a building whose defect is to be detected, is always constant, irrespective of the tapping direction. The balancer 107 is provided to prevent an eccentric stress from being caused in the rotary shaft 106a, and also to prevent the turning moment of the hammer 4 from being affected by the acceleration of gravity depending on the direction of the tapping.

The microphone 7 is buried in a sound insulating member 112c so that it faces the tapping aperture 101a. A sound absorbing member 114 is filled in the tapping section defined by the balancer 107, coil spring 109, and hammer 4 to absorb echo sounds caused inside in the case 104. An indicator 115 such as an LED or the like is provided on the upper cover 103 to visualize for the operator by lighting the result of the detection by tapping the cement intimate mixture. The indicator 115 is an example of an indicator circuit 13 which will be described later, and the indicator 115 is lit or extinguished by a decision circuit 12 described later.

A supporting bracket 116 is rotatably mounted to the side plates 102a and 102b of the case 104. An operating rod 117 is coupled to the supporting bracket 116 to enable the operator to manipulate the case 104. The upper cover 103 is inclined with respect to the bottom plate 101 so that the operator can see the indicator 115 easily.

A main component of a sound wave of a tapping sound caused by the hammer 4 passes straight through a sound passing entrance formed in the partition 105 and is received by the microphone 7. Noises and the like generated in the sound receiving section and tapping section are absorbed by the sound insulating member 112c and sound absorbing member 114. The rotary solenoid 106 is mounted on the partition 105 through vibration insulating members 106b and 106c made of rubber or the like. A mike case 112a accommodates the microphone 7 buried in the sound insulating member 112c to constitute the sound receiving section, and it is mounted on the case 104 through a vibration insulating bushing 112b. The sound receiving section is disposed on the outside of the case 104 and the microphone 7 faces a mike aperture 101b of the bottom plate 101.

In operation, the hammer 4, driven by the rotation of the rotary solenoid 106, always exerts a constant tapping force without being affected by the orientation of the case 104 with respect to the direction of gravity. The hammer 4 strikes or taps the tile 2 which is a face of the cement intimate mixture filled portion of the building through the tapping aperture 101a. A tapping sound generated by the tapping reaches the microphone 7 through the mike aperture 101b of the bottom plate 101. However, since the sound receiving section is located outside the case 104, the tapping sound is received by the microphone 7 in a condition in which a retained sound (echo sound) within the case 104 and driving noises of the rotary solenoid 106, etc. are minimized. As a result, only the tapping sound effective to detect the peeling is received by the microphone 7, and the reliability of the detection result is high.

The result of the detection is visible at the indicator 115. However, other types of indicators or other indicators of the sound type may be additionally provided, and the result of the detection may be recorded on a recorder or the like connected to the detection section.

Figure 16:
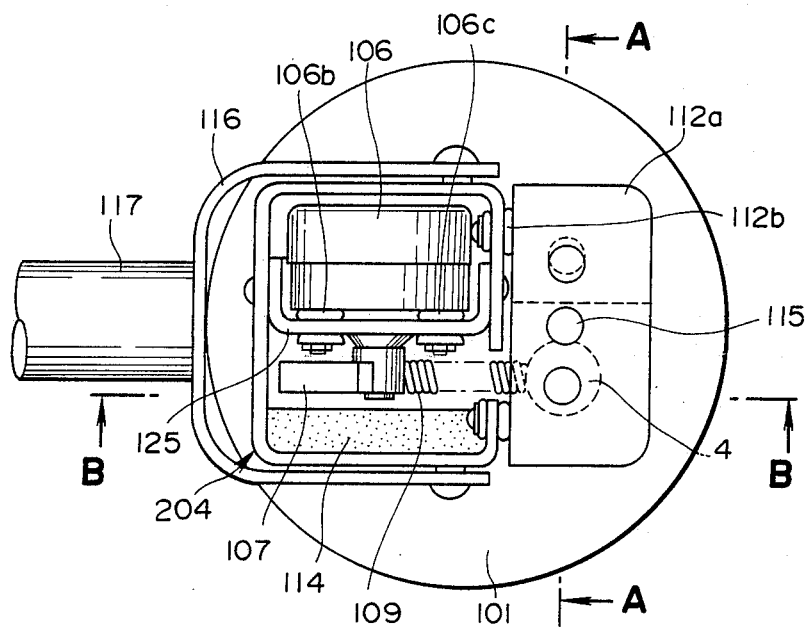
FIG. 16 is a plan view of another example of the tapping section of the apparatus of FIG. 3 with an upper cover removed.
Figure 17:
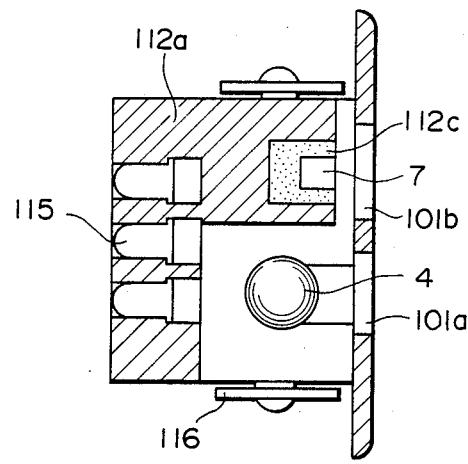
FIG. 17 is a sectional view taken along the line A—A in FIG. 16.
Figure 18:
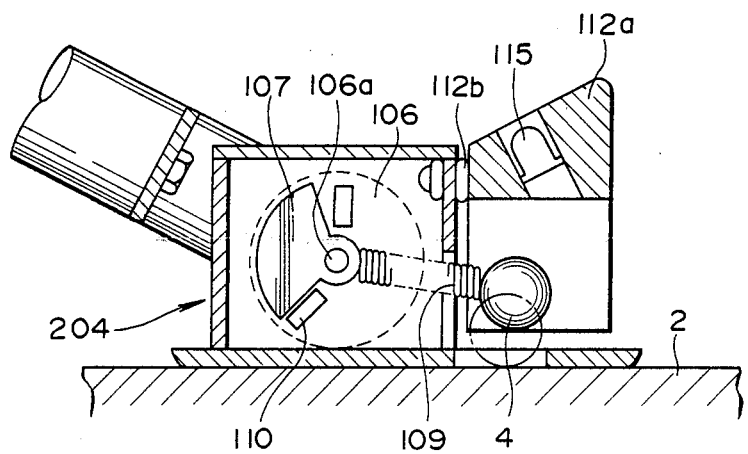
FIG. 18 is a sectional view taken along the line B—B in FIG. 16.

FIGS. 16-18 show another embodiment of the tapping section having a hammer 4 for tapping the cement intimate mixture filled portion of the building, a driving device for driving the hammer 4, a microphone 7, and a case 204.

In this embodiment, as compared with the embodiment shown in FIGS. 12-15, not only the sound receiving section but, also, the hammer 4 is disposed outside the case 204. As a result, a part of the tapping sound of the hammer 4 which is kept or retained within the case 204 is reduced. FIG. 16 is a top view with an upper cover removed. A partition 125 in this embodiment is shorter than the one in the previous embodiment. Other parts are substantially identical with those in the previous embodiment and bear like reference numerals. Thus, the descriptions of the similar parts are omitted. In addition, a mike case 112a is mounted on the side of the case 204 through a vibration insulating bushing 112b.

Figure 3:
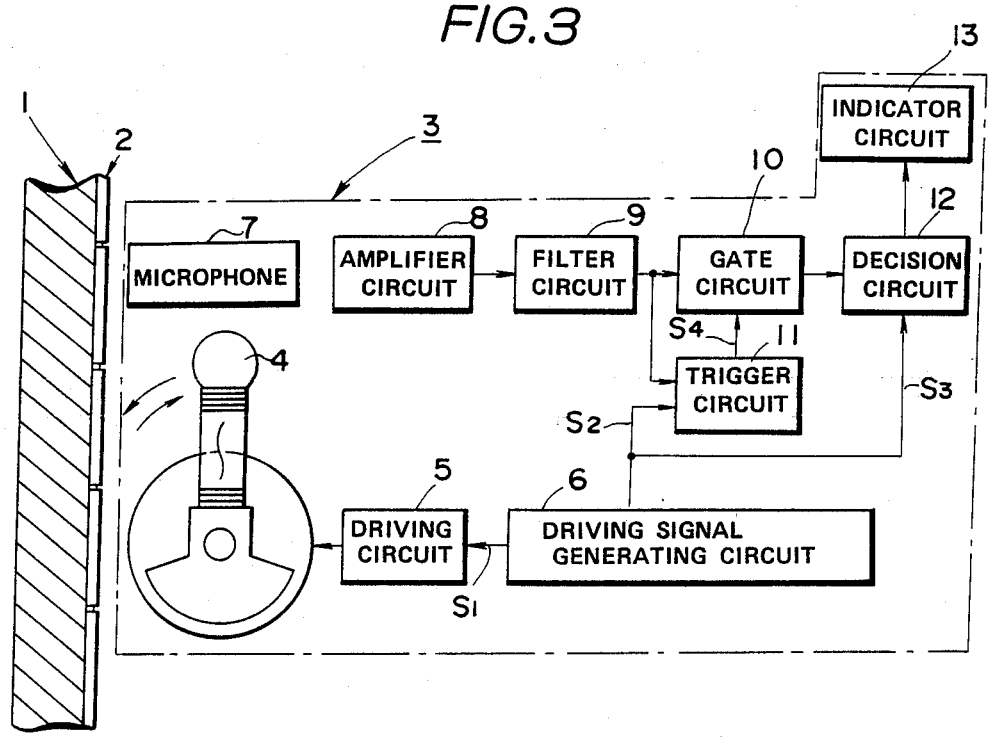
FIG. 3 is a block diagram of an apparatus for implementing the method of the present invention.

FIG. 3 shows an embodiment of a detection apparatus for implementing a method of detecting a defective position in a cement intimate mixture filled portion of a building in accordance with the present invention by using the tapping device as described in the foregoing.

As shown in FIG. 3, a structural body forms an outer wall, inner wall, ceiling, floor or the like, and the surface thereof has a tile 2 attached thereto interposing a mortar filled portion. A detection apparatus 3 serves as a diagnostic apparatus for diagnosing the mortar filled portion.

The diagnostic apparatus 3 includes a transmitting section and receiving section. The transmitting section includes the hammer 4 for tapping the surface of the tile 2, a driving circuit 5 having the rotary solenoid 106 for driving the hammer 4 into rotation, and a driving signal generating circuit 6 for transmitting a driving signal S1 to the driving circuit 5, and at the same time, transmitting driving signals S2 and S3 respectively to a trigger generating circuit 11 and a decision circuit 12 (described later).

The receiving section includes the microphone 7 for collecting a tapping sound generated when vibrations caused by the tapping on the surface reach the mortar filled portion and for converting the tapping sound to an electrical signal, an amplifier circuit 8 for amplifying the electrical signal, a filter circuit 9 for removing unnecessary frequency components (noises) from the amplified signal, a gate circuit 10 for removing a component of the tapping sound at the instant of tapping from the frequency components which have passed the filter circuit 9, the trigger circuit 11 for sending a trigger to the gate circuit 10 upon receiving output signals from the driving signal generating circuit 6 and the filter circuit 9, the decision circuit 12 for taking out a maximum level value (maximum amplitude value) and/or an integrated value of time series signals outputted from the gate circuit 10 and for deciding the presence or absence of a defect by comparing the maximum level signal and the integrated signal with reference values respectively, and an indicator circuit 13 for indicating the result of the decision by a lamp or buzzer. The indicator circuit 13 operates the indicator 115 described in the foregoing in the case of visual indication.

A method of detecting the presence or absence of the defect in the mortar filled portion of the building by using the above apparatus will now be described.

First, the diagnostic apparatus 3 is placed close to the surface of the tile 2 of the object to be tested, and an actuation switch (not shown) is turned on. The driving signal generating circuit 6 generates the driving signal S1, and sends it to the driving circuit 5. At the same time, in order to achieve timing, the driving signals S2 and S3 are sent to the trigger generating circuit 11 and the decision circuit 12, respectively. In response to the driving signal S1, the rotary solenoid 106 of the driving circuit 5 is operated, and the hammer 4 strikes or taps the surface of the tile 2. The sound generated by the tapping is collected by the microphone 7, and the electrical signal converted in correspondence to a sound level is supplied to the gate circuit 10 and the trigger generating circuit 11 via the amplifier circuit 8 and filter circuit 9.

Figure 4:
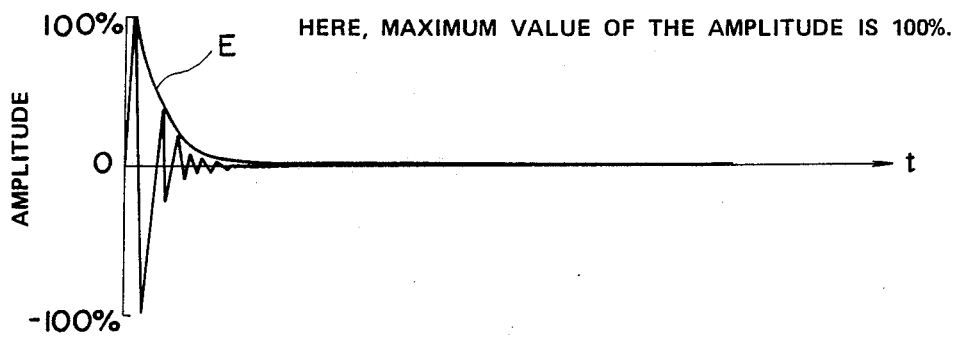
FIG. 4 shows schematically a tapping sound waveform obtained in the apparatus of FIG. 3 when there is no defect.
Figure 5:
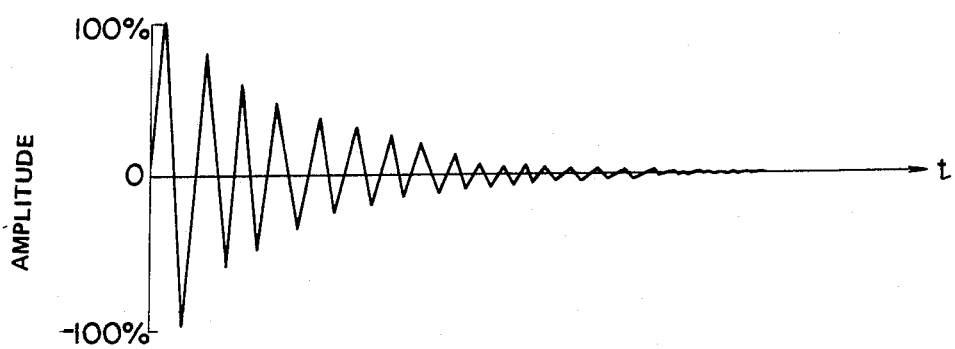
FIG. 5 shows schematically a tapping sound waveform obtained in the apparatus in FIG. 3 when there is a defect.

The gate circuit 10 receives a tapping sound waveform signal as shown in FIG. 4 when there is no defect in the mortar filled portion (referred to as "in the case of perfect"), or a tapping sound waveform signal having a different attenuation characteristic from the first mentioned signal, as shown in FIG. 5, when there is a defect in the mortar filled portion (referred to as "in the case of defective").

Figure 6:
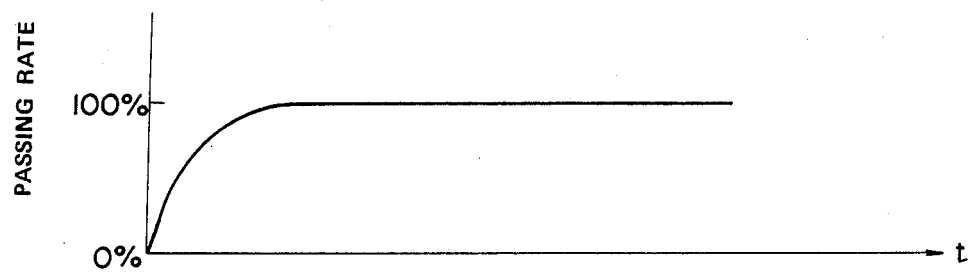
FIG. 6 is a graph showing an example of a passing characteristic of the gate circuit in the apparatus of FIG. 3.

FIG. 6 illustrates a passing characteristic of the gate circuit 10 in which the ordinate represents a passing rate (%) and the abscissa represents time t (ms). The characteristic curve in FIG. 6 is just a reverse curve of the envelope of the tapping sound waveform in FIG. 4 in the case of perfect. As a result, the component of the tapping sound waveform signal in the case of perfect can hardly pass the gate circuit 10.

On the other hand, the trigger generating circuit 11 outputs a trigger signal S4 if the tapping sound signal is inputted from the filter circuit 9 within a predetermined time after receiving the driving signal S2 from the driving signal generating circuit 6. The predetermined time mentioned above corresponds to a period of time in which the hammer 4 taps the object to be tested, the tapping sound is collected by the microphone 7 and outputted as an electrical signal, and is further added with a margin time.

Figure 7:
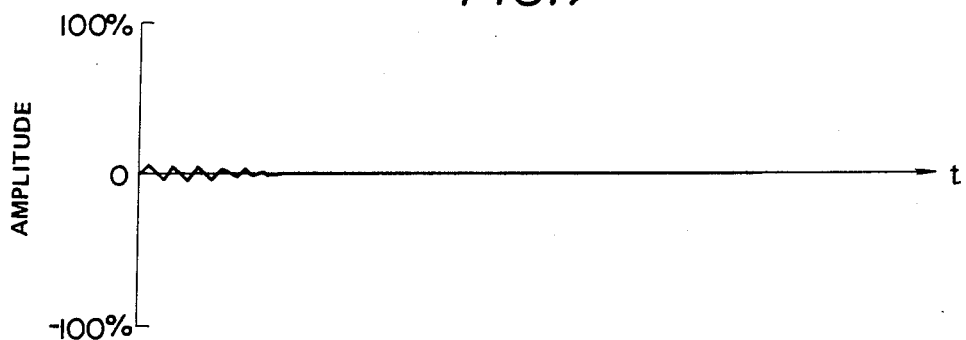
FIG. 7 shows schematically a tapping sound waveform after passing through the gate circuit when there is no defect.
Figure 8:
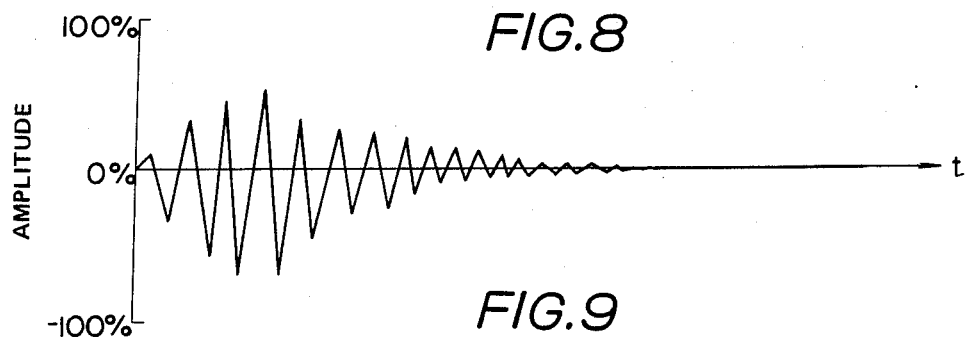
FIG. 8 shows schematically a tapping sound waveform after passing through the gate circuit when there is a defect.

Upon receiving the trigger signal S4, the gate circuit 10 opens the gate for a preset time (e.g., 5 ms). Thus, when the tapping sound waveform signal of the perfect tile shown in FIG. 4 is inputted to the gate signal 10, most of the signal will be blocked. As a result, a passing output signal results, as shown in FIG. 7, in which the tapping sound component at the instant of tapping is removed. However, when the tapping sound waveform signal of the defective tile shown in FIG. 5 is inputted, the tapping sound component at the instant of tapping is also removed and only that portion different from the tapping sound waveform of the perfect case is allowed to pass, as shown in FIG. 8.

The decision circuit 12 samples the output signal from the gate circuit 10 and holds a peak value of the amplitude of the sampled signal to compare the peak value with an amplitude reference value which is adjusted beforehand. Alternatively, an integrated value of the output signal is obtained, and the integrated value is compared with an integration reference signal. In the comparison, if a difference from the reference value is small, it is decided that the mortar filled portion is perfect, and if the difference from the reference value is great, it is decided that a defect is present in the mortar filled portion. In this respect, either the peak value or the integrated value may be used, and if both are used, the accuracy of decision will be enhanced.

The result of the decision is outputted to the indicator circuit 13, and it is indicated by a lamp or buzzer.

For example, in a test of a deep portion having a depth of 40 mm, the time required for one position is only 10 ms.

In the embodiment mentioned above, since the tapping sound waveform component in the perfect case is removed by the simple gate circuit 10, there is no need to perform a complex waveform analysis as in the prior art. Furthermore, since the initial tapping sound signal is removed by the gate circuit 10, the presence or absence of the defect in a deep portion can be diagnosed with high accuracy. Moreover, the diagnosis is started simultaneously with the generation of a signal, and the diagnosis is also completed at the time of completion of the signal. Thus, real time processing is possible, and the diagnosis can be performed at high speeds.

Accordingly, the presence or absence of a defect can be detected easily, rapidly and without fail with a simple circuit.

Next, in the test of a mortar filled portion, a driving signal is outputted anew from the driving signal generating circuit 6, and a part of the driving signal is sent to the decision circuit 12 as a peak erasing signal S3. By this signal, the holding of the above-mentioned amplitude peak value and the integrated value is released to prepare for the next cycle.

In this embodiment, either the maximum signal level value of the tapping sound signals excepting the tapping sound at the instant of the tapping or the integrated value of the time series signals excepting the tapping sound at the instant of the tapping is used to perform the diagnosis as to the presence or absence of the peeling. However, it is advantageous if both values are used in that the reliability of the result of the diagnosis will be enhanced.

Figure 9:
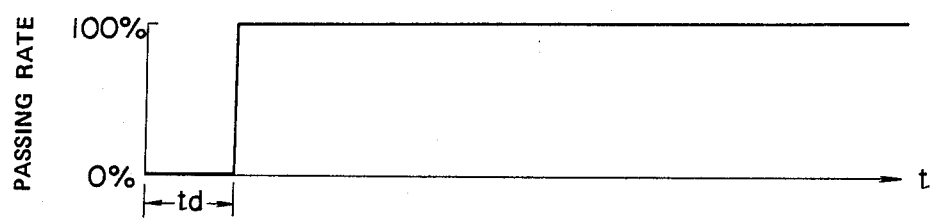
FIG. 9 is a graph showing another example of the passing characteristic of the gate circuit in the apparatus of FIG. 3.
Figure 10:
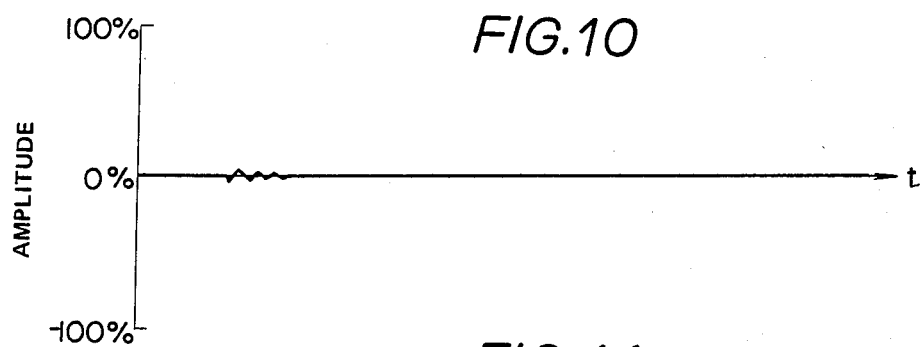
FIG. 10 shows a tapping sound waveform after passing through the gate circuit having the characteristic of FIG. 9 when there is no defect.
Figure 11:
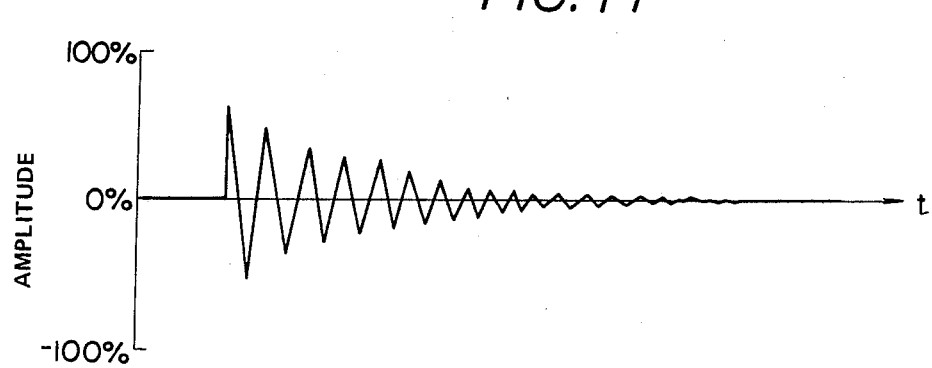
FIG. 11 shows a tapping sound waveform after passing through the gate circuit having the characteristic of FIG. 9 when there is a defect.
Figure 12:
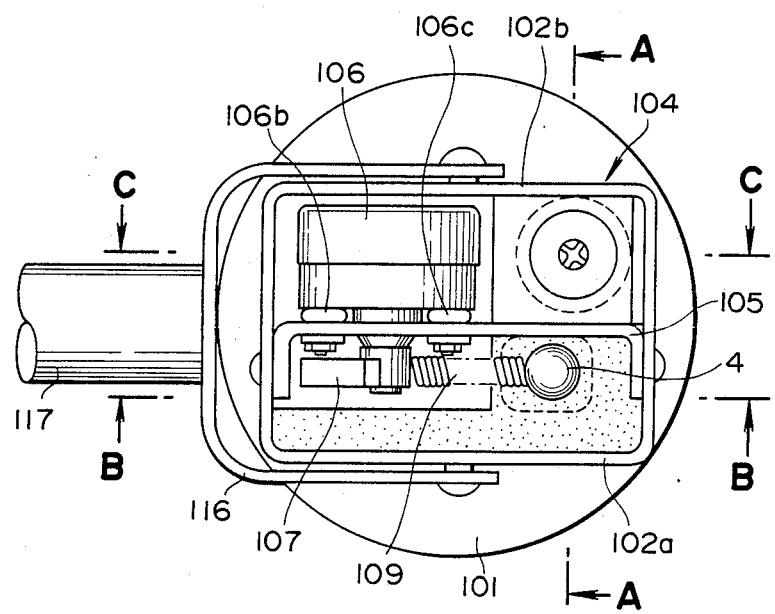
FIG. 12 is a plan view of an example of a tapping section of the apparatus of FIG. 3 with an upper cover removed, the tapping section being applied to a building.
Figure 13:
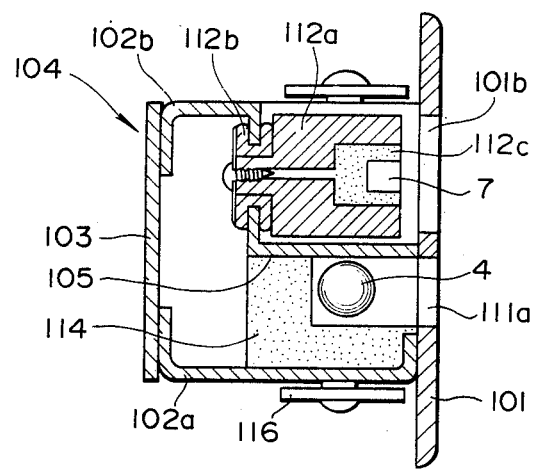
FIG. 13 is a sectional view taken along the line A—A in FIG. 12.
Figure 14:
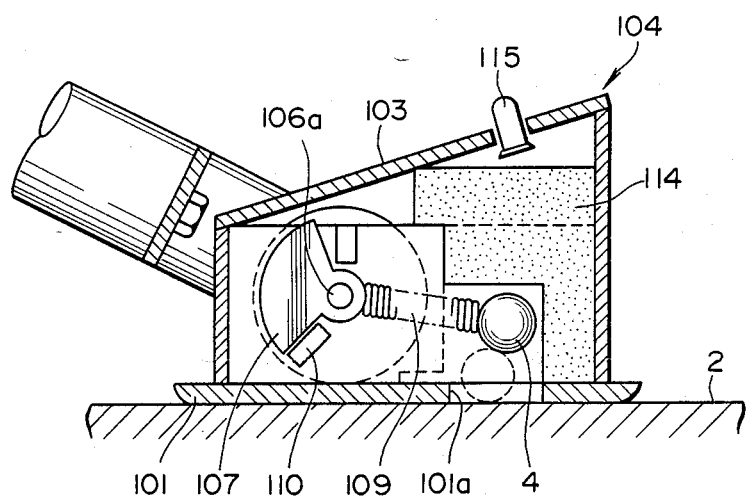
FIG. 14 is a sectional view taken along the line B—B in FIG. 12.
Figure 15:
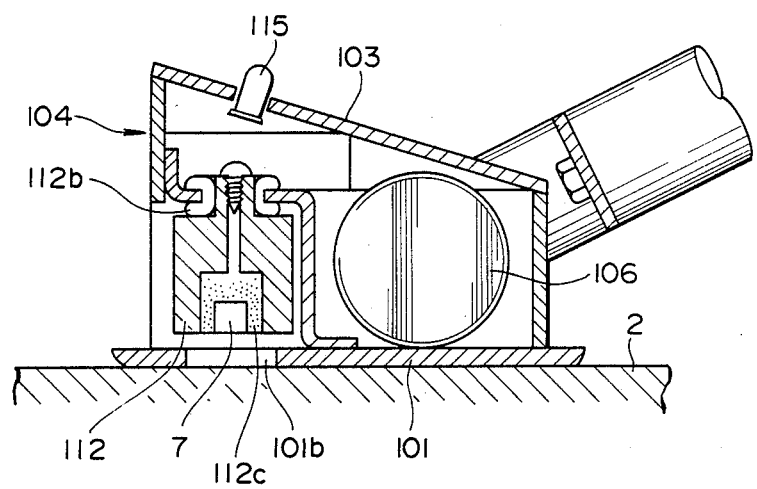
FIG. 15 is a sectional view taken along the line C—C in FIG. 12.

The signal passing characteristic of the gate circuit 10 may be changed to the one as shown in FIG. 9. In this case, the gate is fully opened instantly after elapsing a predetermined delay time td from the time of reception of the trigger signal S4 from the trigger signal generating circuit 11. The tapping sound waveform signal outputted from the gate circuit 10 in the case of perfect is shown in FIG. 10. Furthermore, the tapping sound waveform signal in the case where there is a defect is shown in FIG. 11. In either case, the tapping sound at the instant of tapping is removed by the delay time td. It is possible to use only a part of the tapping sound waveform signal in which the amplitude values of both cases differ from each other to a great extent. In this arrangement, the gate circuit can be made simpler.

The gate circuit having the passing characteristic of FIG. 6 and the gate circuit having the passing characteristic of FIG. 9 may be used in combination so that the two gate circuits are switched from one to the other depending on whether the testing position is shallow or deep.

In the foregoing description of the embodiments, both the maximum amplitude value of the tapping sound signal excepting the tapping instant and the integrated value are used at the same time to perform the diagnosis, or either one of the two values is used to perform the diagnosis. However, both the values may be used separately in the diagnosis depending on whether the testing position is shallow or deep. Furthermore, the decision circuit 12 in FIG. 3 may be formed by a microcomputer.

In the embodiments shown herein, the detection or diagnosis of a defect is performed as to the mortar filled portion in which a tile is attached to the building interposing the mortar filled portion. However, the invention is not limited to this but it is applicable to the diagnosis of a defective portion of a mortar filled portion of a structural portion of a building, or the diagnosis of a defect in a mortar filled portion of a mortar finished portion of a building.

The level of the amplitude reference value in the decision circuit 12 may be changed depending on the object to be diagnosed such as a detection of peeling of a tile, a detection of an unfilled position in a concrete filled portion within a structural body of a building, and the like. In this manner, the detection of a defect can be achieved with high accuracy.

Figure 20:
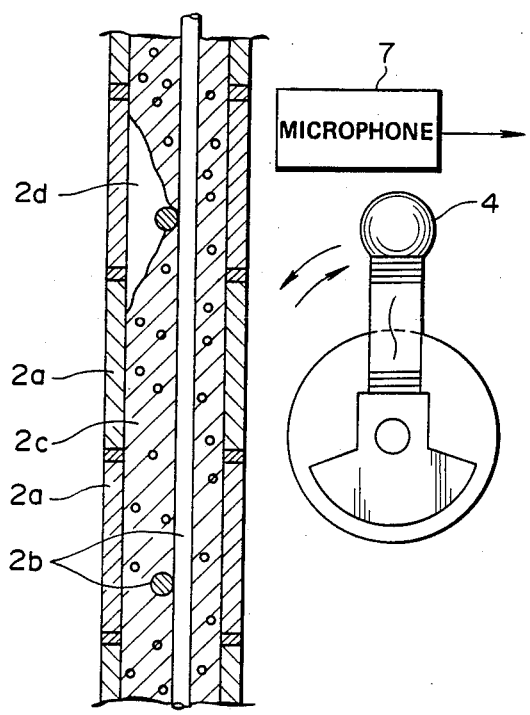
FIG. 20 shows a part of a building in cross section formed by piling concrete blocks and a part of the tapping section of the apparatus of FIG. 3.
Figure 19:
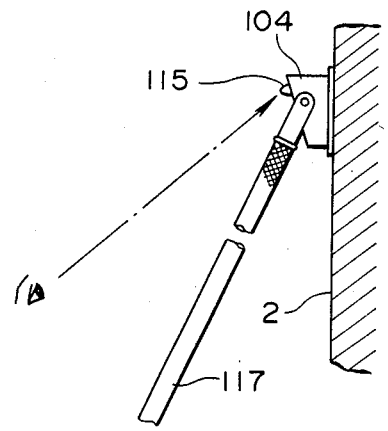
FIG. 19 is a side view of the tapping section of the apparatus of FIG. 3 which is being applied to a building.

FIG. 20 shows another embodiment of the object of the defect detection in which a building is structured by piling concrete blocks. In the Figure, there is shown concrete blocks 2a which are piled up, reinforcing steel bars 2b, filled concrete 2c, and a defective portion 2d in which the concrete is not filled. Furthermore, in FIG. 20, only the hammer 4 and microphone 7 of the diagnostic apparatus 3 are shown, and other members are identical with the members shown in FIG. 3.

As described above, in the present invention, since the tapping sound signal, with the exception of the tapping sound generated at the instant of tapping, is used for the diagnosis, real time processing is made possible, and quick diagnosis can be achieved. Furthermore, even when the position of a defect is as deep as 20 mm or more, a highly reliable diagnosis result can be obtained. In addition, the apparatus for implementing the method of the invention is simple in arrangement and small in size, and no particular technical knowledge and experience are required to use the apparatus.

We claim:

1. A method of testing for a defective position in a cement intimate mixture comprising the steps of:

(a) tapping a surface of the cement intimate mixture to be tested;
(b) converting a tapping sound generated by the tapping to a tapping sound signal which exhibits an attenuation characteristic;
(c) passing said tapping sound signal through a gate circuit having a passing characteristic substantially corresponding to a reverse of an attenuation characteristic in a perfect cement intimate mixture thereby to inhibit passing of a tapping sound signal which would be produced in the case of a perfect cement intimate mixture and also to inhibit passing of a tapping sound signal generated at the instant of the tapping;
(d) obtaining at least one of a peak value of an amplitude or an integrated value of the signal after passage thereof through said gate circuit; and
(e) comparing said peak value of the amplitude or said integrated value with a reference value to determine whether a defective portion exists in the cement intimate mixture.

2. A method of testing for a defective position in a cement intimate mixture, comprising the steps of:
(a) tapping a surface of the cement intimate mixture;
(b) converting a tapping sound generated by the tapping to a tapping sound signal;
(c) obtaining an attenuation characteristic of the tapping sound in the tapping sound signal;
(d) passing the attenuation characteristic through a gate circuit which removes tapping sound components of an attenuation characteristic of a perfect cement intimate mixture to create a modified attenuation characteristic, said attenuation characteristic of the perfect cement intimate mixture having a smaller time constant than an attenuation characteristic of a defective cement intimate mixture; and
(e) comparing the modified attenuation characteristic to a reference value to determine whether a defective position exists in the cement intimate mixture.

3. An apparatus for testing a cement intimate mixture to determine whether a defect exists in the mixture, comprising;
(a) means for tapping a surface proximate the cement intimate mixture;
(b) means for sensing the sound created by the tapping means in the mixture;
(c) means for converting the input received by the sensing means into an attenuation characteristic;
(d) means for removing tapping sound components of an attenuation characteristic of a perfect cement intimate mixture to create a modified attenuation characteristic, said attenuation having a smaller time constant and attenuation characteristic of a defective cement intimate mixture;
(e) means for comparing the modified attenuation characteristic to a predetermined value, and
(f) means for indicating whether the modified attenuation characteristic exceeds the predetermined value.

4. The apparatus of claim 3, wherein the means for tapping is a hammer which applies a constant amount of force each time it taps a surface.

5. The apparatus of claim 3, further comprising a support bracket rotatably mounted to said casing, and an operation rod connected to said bracket to allow an operator to test for a defective position at multiple orientations of the apparatus.

6. The apparatus of claim 3, wherein the means for tapping comprises;
a rotary solenoid having a rotary shaft; and
a hammer attached to the rotary shaft.

7. The apparatus of claim 6, wherein the means for tapping further comprises:
a balancer being attached to the rotary shaft, the balancer restricted in the angle of rotation in which it may move.

8. The method of claim 1, wherein the first steps are performed on the basis of real time.

9. The apparatus of claim 3, wherein the means for comparing includes a microprocessor.

10. The apparatus of claim 7, wherein the apparatus can test for a defective position at multiple orientations of said apparatus and the hammer applies a constant amount of force irrespective of the orientation of said apparatus.

11. A method according to claim 2, wherein said passing characteristic step (d) corresponds to a reverse of an envelope of the tapping sound waveform in the case of a perfect mixture.

12. A method according to claim 1, wherein said passing characteristic of step (c) is represented by a curve which rises after a predetermined delay time vertically and thereafter maintains a hundred percent passing rate.

13. An apparatus for testing a cement intimate mixture to determine whether a defect exists in the mixture, comprising:
(a) a hammer attached to a rotary solenoid for tapping a surface of the cement intimate mixture;
(b) a microphone for sensing the sound created by the hammer in the mixture and for converting to an electrical signal;
(c) a gate circuit connected to said microphone having a passing characteristic substantially corresponding to a reverse of an attenuation characteristic of a tapping sound signal in a perfect cement intimate mixture to thereby inhibit passing of an electrical signal which would be produced in the case of a perfect mixture and also to inhibit passing of an electrical signal generated at the instant of the tapping;
(d) a decision circuit connected to said gate circuit for sample holding a peak amplitude value or obtaining an integrated value of an output signal from said gate circuit, said decision circuit also comparing said peak amplitude value or said integrated value with a reference value to determine whether a defective portion exists in the cement intimate mixture; and
(e) an indicator electrically connected to said decision circuit and attached on the cover of said casing for displaying the result of the determination in said decision circuit.

14. An apparatus for testing a cement intimate mixture to determine whether a defect exists in the mixture, comprising;
(a) a casing having a cover, side plates, and a bottom plate formed with a microphone hole and a tapping hole, said casing having a partition plate 40 to separate the casing into two compartments;
(b) a hammer and a rotary solenoid for tapping the cement intimate mixture, said rotary solenoid being fixed to the partition plate so that said hammer is accommodated in one of said two compartments with a tapping portion of said hammer facing the tapping hole of said bottom plate,
(c) sound absorbing material disposed within said one of the two compartments,
(d) a microphone for converting a sound signal produced by tapping the cement intimate mixture into an electrical signal, said microphone being accommodated in the other of said two compartments to face the microphone hole of the bottom plate,
(e) a microphone case, the microphone being mounted therewithin;
(f) sound insulating material disposed in the microphone case and surrounding the microphone,
(g) at least one vibration insulating bushing attaching the microphone case to a side plate of said casing so that noises and vibrations produced by a rotating portion of said hammer and said rotary solenoid are substantially minimized and only a tapping sound is allowed to enter said microphone through the microphone hole of the bottom plate;
(h) a signal processing section including a gate circuit for inhibiting pass of a sound signal component produced in the case of perfect cement intimate mixture, and a decision circuit for obtaining a peak amplitude value or an integrated value of a signal from said gate circuit and for comparing said peak amplitude value or said integrated value with a reference value to determine the absence or presence of the defect; and
(i) an indicator electrically connected to said signal processing section and attached to said casing for displaying visually or by alarm when the defect exists.

* * * * *